United States Patent [19]

Muhl et al.

[11] Patent Number: 5,057,545
[45] Date of Patent: Oct. 15, 1991

[54] FIRE RETARDANT FOAM MATERIALS

[75] Inventors: Laszlo A. Muhl, Carlsbad; Thomas T. Omori, Glendale; John Milligan, Encinitas, all of Calif.

[73] Assignee: Fire Retardant Foam Technologies, Inc., Carlsbad, Calif.

[21] Appl. No.: 611,298

[22] Filed: Nov. 9, 1990

Related U.S. Application Data

[63] Continuation-in-part of Ser. No. 418,691, Oct. 2, 1989, abandoned, which is a continuation of Ser. No. 245,956, Sep. 15, 1988, abandoned, which is a continuation of Ser. No. 78,026, Jul. 27, 1987, abandoned, which is a continuation of Ser. No. 911,015, Sep. 24, 1986, abandoned.

[51] Int. Cl.$^5$ .............................................. C08J 9/14
[52] U.S. Cl. .................................... 521/103; 521/123; 521/128; 521/166; 521/906; 523/179
[58] Field of Search ............... 521/123, 128, 129, 103, 521/166, 906; 523/179

[56] References Cited

U.S. PATENT DOCUMENTS 4,725,457  2/1988  Ward et al. ........................ 528/28

Primary Examiner—Morton Foelak
Attorney, Agent, or Firm—Lieberman Rudolph & Nowak

[57] ABSTRACT

A fire retardant flexible polyurethane foam and method for its production are provided. The foam is prepared by reacting in the presence of a metallic catalyst and a non-metallic catalyst (a) a polyol having a molecular weight between about 1000 and about 9000; (b) a polyisocyanate; (c) a cross-linking agent; (d) a foaming agent; (e) a surfactant; (f) a halogenated hydrocarbon; (g) melamine powder; (h) antimony oxide; and (i) sodium borate.

5 Claims, No Drawings

FIRE RETARDANT FOAM MATERIALS

BACKGROUND OF THE INVENTION

This application is a continuation-in-part of U.S. Ser. No. 418,691, filed Oct. 2, 1989, now abandoned, which is a continuation of U.S. Ser. No. 245,956, filed Sept. 15, 1988, now abandoned, which is a continuation of U.S. Ser. No. 078,026, filed July 27, 1987, now abandoned, which in turn is a continuation of U.S. Ser. No. 911,015, filed Sept. 24, 1986, now abandoned. The contents of all of the above applications are hereby incorporated by reference.

The invention relates to polyurethane foams and specifically to polyurethane foams having fire retardant properties.

Polyurethanes are a class of chemical compounds obtained by the reaction of a polyisocyanate with materials containing hydroxyl groups such as polyesters, polyethers or glycols. Typically, foamed polyurethane materials are formed by the reaction of a polyhydroxyl compound ("polyol") and a polyisocyanate in the presence of a foaming agent. The term polyurethane as used herein also refers to polymers containing urea groups resulting from a polyisocyanate reaction with an amine or water ("polyisocyanurates").

Flexible polyurethane foams are widely used in industrial applications requiring strong, resilient, solvent-resistant cushion materials. Flexible polyurethane foams are commonly used, for instance, in the manufacture of cushioned seats for automobiles and aircraft and in the manufacture of foam mattresses.

A well-recognized problem associated with polyurethane foams is flammability. Gases given off during combustion tend to be highly toxic, and inflamed polyurethanes tend to drip burning material. The prior art is replete with attempts at making polyurethane foam less flammable. Most such methods entail incorporating fire resistant additives into the foam and/or covering the foam with a fire retardant coating. However, no prior art method is wholly satisfactory because the foams produced have impaired physical properties and/or high cost of manufacture. This problem is especially acute for low density (less than about 4 pounds per cubic foot) polyurethane foams. Moreover, low density fire retardant, flexible polyurethane foams having satisfactory physical properties (such as satisfactory rebounding, memory, elongation and strength) are typically difficult to prepare.

U.S. Pat. No. 3,897,372, issued July 29, 1975, to Kehr, et al., describes a smoke/flame retardant hydrophilic urethane. Kehr, et al. teach the use of a polyisocyanate, a polyol, a foam agent, a halogenated hydrocarbon, melamine power and aluminum hydrate to produce a foam. However, the physical properties (e.g., density) of the foam are not disclosed, nor are its characteristics (e.g. flexible vs. rigid). Moreover, Kehr, et al. do not teach the advantages of using a blend of salts and do not teach or suggest the use of antimony oxide or sodium borate.

The subject invention provides a fire retardant polyurethane foam having physical properties comparable with foams lacking fire resistant properties. The subject invention also provides a flexible foam which is economical to produce.

SUMMARY OF THE INVENTION

The subject invention provides a polyurethane foam prepared by reacting in the presence of a metallic catalyst and a non-metallic catalyst: (a) a polyol having a molecular weight between about 1000 and about 9000; (b) a polyisocyanate; (c) a cross-linking agent; (d) a foaming agent; (e) a surfactant; (f) a halogenated hydrocarbon; (g) melamine powder; (h) antimony oxide; and (i) sodium borate. The invention further comprises a method for making a fire retardant polyurethane by reacting in the presence of a metallic catalyst and a non-metallic catalyst (a) a polyol having a molecular weight between about 1000 and about 9000; (b) a polyisocyanate; (c) a cross-linking agent; (d) a foaming agent; (e) a surfactant; (f) a halogenated hydrocarbon; (g) melamine powder; (h) antimony oxide; and (i) sodium borate.

DETAILED DESCRIPTION OF THE INVENTION

The subject invention provides inexpensive polyurethane compositions having excellent physical and fire retardant properties which are highly useful in preparing flexible polyurethane foam products.

The invention comprises a polyurethane composition prepared by reacting in the presence of a metallic catalyst and a non-metallic catalyst (a) a polyol having a molecular weight between about 1000 and about 9000; (b) a polyisocyanate; (c) a cross-linking agent; (d) a foaming agent; (e) a surfactant; (f) a halogenated hydrocarbon; (g) melamine powder; (h) antimony oxide; and (i) sodium borate.

The term "polyol" as used herein means any organic compound or mixture of compounds containing hydroxyl groups, the compound or mixture having a hydroxyl number greater than about 50 mg KOH/g. Examples of such compounds include polyesters, polyethers, castor oils and glycols. The preferred polyols are glycols, especially polypropylene glycols, because they impart superior physical properties to the flexible forms produced. Polyols useful in the invention have a molecular weight between about 1000 and about 9000. Polyols of lower molecular weight tend to yield foams having inferior physical properties, whereas, higher molecular weights are viscous and difficult to blend. The following tradename polyols have been found particularly useful: Union Carbide Chemical Company 3428, Olin Matheson Chemical Company 8536, Mobay Chemical Company 3936, Union Carbide Chemical Company 1134 and Dow Chemical Company 4701.

Polyisocyanates useful in the invention include tolylene diisocyanate (TDI), methylenediphenylisocyanate (MDI), polymeric isocyanate (PMDI), aliphatic disocyanates and mixtures thereof. For producing flexible foams, the preferred polyisocyanates include MDI and a mixture of 80 weight percent TDI and 20 weight percent MDI. MDI is preferred because it is less toxic than TDI. A typical MDI useful in the invention is marketed by Mobay Chemical Company as MDI type isocyanate MR.

The cross-linking agent can be any chemical or mixture of chemicals capable of cross-linking polyurethane polymers during the polymerization reaction. Cross-linking agents useful in the invention include 1,4 butanediol, bisphenol-A, diethanolamine and triethanolamine. Diethanolamine and triethanolamine offer the advantage of costing less than the other listed cross-linking agents.

The foaming agent can be any gas or gas precursor which will cause the reaction mixture to foam under reaction conditions. Examples of suitable foaming agents include freon, nitrogen, volatile organic liquids and water (which reacts with excess isocyanate to liberate carbon dioxide during the reaction). The preferred foaming agents are freon, water and combinations of freon and water because of the ease of controlling the quantity and quality of the foamed reaction product using such foaming agents.

The surfactant can be an material capable of stabilizing the foam cell structure during the reaction. The preferred surfactants, because of their excellent cell structure stabilizing ability, are silicone-based surfactants such as L5303 surfactant marketed by the Union Carbide Company.

The halogenated hydrocarbon used in the subject invention can be a chlorinated paraffin or a bromine-containing aromatic such as pentabromodiphenyl oxide (often termed "liquid bromine"). A preferred halogenated hydrocarbon, because of its superior fire retardant properties, is a pentabromodiphenyl oxide blend marketed by Great Lakes Chemical Corporation as DE-60F.

The invention further comprises melamine, antimony oxide and sodium borate. Antimony oxide in combination with sodium borate demonstrates excellent fire retardant properties. The sodium borate is preferably present as sodium borate pentahydrate and/or sodium borate decahydrate. Sodium borate decahydrate is most preferred because of its excellent fire retardant properties.

The particle sizes of the melamine powder, antimony oxide and sodium borate are preferably between about 100 and about 325 mesh (U.S. Standard Mesh Size). Particle sizes between 100 and 200 mesh are more preferred. Smaller particles tend to yield products having decreased fire retardant properties and tend to clump and inhibit cross-linking. Larger particles tend to yield products having reduced physical properties and very large particles are difficult to mix. A preferred embodiment of the invention uses a bimodal distribution of small and large particles, such as a 50:50 mixture of 100 mesh and 200 mesh particles. Bimodel mixtures tend to distribute better during product preparation yielding products having a uniform, well-formed matrix structure and excellent physical and fire retardant properties.

In one embodiment of the invention, the reactive ingredients comprise 100 parts by weight of polyol and between about 20 and about 70 parts polyisocyanate. Where the polyisocyanate is MDI, a preferred range is between about 30 and about 70 parts by weight, more preferably between about 40 and about 60 parts. Where the polyisocyanate is an 80–20 mixture of TDI and MDI, the preferred range is between about 20 and about 100 parts by weight, more preferably between about 40 and about 55 parts. Too little polyisocyanate or too much polyisocyanate lead to incomplete polymerization during the reaction step and the consequent failure of the reaction product to form a strong, uniform foam having good physical properties.

If the cross-linking agent is diethanolamine, the concentration of the cross-linking agent in the reactive ingredients is between about 0.8 and about 4 parts by weight, preferably between about 1 and about 2 parts. Lower concentrations lead to products having incomplete cross-linking with decreased physical properties. Higher concentrations lead to products which are too stiff.

If water is used in the foaming agent, the reactive ingredients further comprise between about 1 and about 5 parts by weight water, preferably between about 2 and about 4 parts. If freon is used in the foaming agent, the reactive ingredients can also comprise between about 1 and about 25 parts freon by weight, preferably between about 10 and about 20. Lower concentrations of foaming agent lead to products with a poorly developed foam structure. Higher concentrations lead to products having foam structures which are irregular and overly large.

The subject invention may further comprise between about 0.5 and about 2 parts by weight surfactant, preferably between about 1 and about 2 parts. Too little surfactant results in an underdeveloped, irregular foam and excessive quantities are uneconomical.

If the halogenated hydrocarbon is a bromine-containing aromatic, the reactive ingredients further comprise between about 2 and about 30 parts by weight of the bromine-containing aromatic, preferably between about 10 and about 20 parts. If the halogenated hydrocarbon is a chlorinated paraffin, the reactive ingredients comprise between about 10 and about 40 parts by weight chlorinated paraffin, preferably between about 15 and about 25 parts. Too little halogenated hydrocarbon results in products which do not rapidly self-extinguish and too much halogenated hydrocarbon is uneconomical and leads to weak and overly dense products.

The reactive ingredients may further comprise between about 5 and about 30 parts by weight melamine powder, preferably between about 5 and about 15 parts. Lower concentrations of melamine powder result in products having poor fire retardant properties and higher concentrations result in products which are overly stiff.

The reactive products may further comprise between about 2 and about 20 parts by weight of antimony oxide, preferably between about 2 and about 5 parts. Lower concentrations result in products having reduced fire retardant properties. Higher concentration result in products which are overly dense with only marginally increased fire retardancy.

The reactive ingredients may further comprise between about 20 and about 120 parts by weight of sodium borate, preferably between about 50 and about 80 parts. Sodium borate may comprise between about 30% and about 70% by weight of the total ingredients. Lower concentrations result in products having reduced fire retardant properties and higher concentrations tend to retard foaming and result in overly dense products.

The polyurethane of the invention can be conveniently prepared by initially mixing each of the ingredients into one of two components and then reacting the components. The first component can be comprised of the polyol, the cross-linking agent, the foaming agent, the surfactant, the melamine powder, antimony oxide and sodium borate. The second component can be comprised of the polyisocyanate and the halogenated hydrocarbon. Preferably, for ease of mixing, the weight ratio of the polyol-containing component to the polyisocyanate-containing component is between about 70:30 and about 80:20. It is also preferable that the melamine powder and the salt particles are homogeneously combined with the other ingredients with a mill such as Koruma or other high shear mixing equipment.

The polyurethane compositions of the subject invention can further comprise a wide variety of other ingredients such as pigments, resins and extenders for the purpose of imparting particular physical properties to the product. In most cases, the addition of such ingredients does not appreciably reduce the excellent fire retardant properties of the compositions.

The two components can be reacted at atmospheric pressure at between about 40° F. and about 140° F. The reaction is carried out in the presence of a metallic catalyst and a non-metallic catalyst. The metallic catalyst is preferably a tin catalyst. Tin catalysts are very active in promoting the polymerization reaction. A preferred tin catalyst is a dibutyl tin dilorate (e.g., T-12 catalyst marketed by Air Products and Chemicals, Inc.). The non-metallic catalyst can be any non-metallic material which is catalytically active in the polymerization reaction. Amino-functional catalysts ("amine catalysts") such as triethylenediamine are preferred because of their high rate of catalyzation. The catalysts can be added to the reactants during the reaction step or they can be added to the polyol-containing component prior to the reaction step.

Flexible polyurethane foams prepared by the subject method have excellent physical properties including, but not limited to, excellent rebounding characteristics, memory, elongation characteristics, and tear strength, in addition to excellent fire retardant properties. Polyurethanes of the invention are very difficult to ignite and, if ignited, self-extinguish when removed from the ignition source. During ignition, the material intumesced to quickly form a continuous, insulative char which shields the interior of the material from heat and oxygen and inhibits the emission of smoke and toxic gasses from the interior of the foam. Emissions of dripping flammable materials is also markedly reduced. Moreover, the flexible polyurethane foams of the invention are comparable in price to ordinary, non-fire retardant flexible polyurethane foams.

An important advantage of the subject invention over prior art methods is the ability to prepare fire retardant flexible polyurethane foams of low density. (i.e., less than about 4 pounds per cubic foot). Flexible polyurethane foams having densities less than about 3 pounds per cubic foot or even 2 pounds per cubic foot together with the physical and fire retardant properties described above can also be prepared by the method of the subject invention.

The following Examples are provided to better describe the subject invention. However, these Examples are not to be construed as limiting in any manner the scope of the invention as set forth in the claims and their equivalents.

EXAMPLE 1

A first example of the product of the invention is prepared by reacting (in parts by weight):

| Ingredient | Quantity |
| --- | --- |
| Polyol 9232 | 100.00 |
| MDI | 50.90 |
| Water | 2.80 |
| Diethyanolamine | 1.77 |
| L5303 surfactant | 1.50 |
| LV33 catalyst | 0.21 |
| T-12 catalyst | 0.20 |
| F-11B freon | 15.00 |
| Liquid bromine | 15.00 |
| Melamine powder | 10.00 |
| Antimony Oxide | 4.00 |
| Sodium borate decahydrate | 70.00 |

EXAMPLE 2

A second example of the product of the invention is prepared by reacting (in parts by weight):

| Ingredient | Quantity |
| --- | --- |
| 9232 diol | 100.00 |
| TDI-MDI mixture (80:20) | 50.40 |
| Water | 4.00 |
| Diethanolamine | 1.18 |
| L5303 surfactant | 1.00 |
| LV33 catalyst | 0.09 |
| T-12 catalyst | 0.10 |
| Liquid bromine | 15.00 |
| Melamine powder | 10.00 |
| Antimony oxide | 4.00 |
| Sodium borate decahydrate | 70.00 |

Although the present invention has been described in considerable detail with reference to certain preferred versions, other versions are possible. Therefore, the spirit and scope of the appended claims should not be limited to the description of the preferred versions contained herein.

What is claimed is:

1. A method for making a fire retardant polyurethane foam comprising reacting in the presence of a metallic catalyst and a non-metallic catalyst:
   (a) a polyol having a molecular weight between about 1000 and about 9000;
   (b) a polyisocyanate;
   (c) a cross-linking agent;
   (d) a foaming agent;
   (e) a surfactant;
   (f) a halogenated hydrocarbon;
   (g) melamine;
   (h) antimony oxide; and
   (i) sodium borate.

2. A method of claim 1, wherein the metallic catalyst comprises tin.

3. A method of claim 2, wherein the metallic catalyst comprises dibutyl tin dilorate.

4. A method of claim 1, wherein the non-metallic catalyst is an amino-functional catalyst.

5. A method of claim 4, wherein the amino-functional catalyst is triethylenediamine.

* * * * *